United States Patent [19]

Takahashi et al.

[11] Patent Number: 4,806,577

[45] Date of Patent: Feb. 21, 1989

[54] ADHESIVE COMPOSITION

[75] Inventors: Kazutomo Takahashi; Kazuo Kodama, both of Yokohama; Minoru Saotome, Ebina, all of Japan

[73] Assignee: Nippon Shokubai Kagaku Kogyo Co., Ltd., Osaka, Japan

[21] Appl. No.: 931,413

[22] Filed: Nov. 14, 1986

[51] Int. Cl.$^4$ ............... C08L 33/14; C08L 63/00; C08K 3/00

[52] U.S. Cl. ................... 523/445; 523/451; 523/458; 523/459; 523/439

[58] Field of Search ............... 523/439, 445, 451, 458, 523/459

[56] References Cited

U.S. PATENT DOCUMENTS 3,228,823  1/1966  Usala ................ 525/117
3,488,249  1/1970  Wolinski ............ 161/185
4,609,692  9/1986  Huybrechts ......... 523/439

FOREIGN PATENT DOCUMENTS 1527470  6/1967  France .
38-18560  9/1963  Japan .
38-26763  12/1963  Japan .
1415983  12/1975  United Kingdom ............ 523/439

Primary Examiner—C. Warren Ivy
Attorney, Agent, or Firm—Omri M. Behr

[57] ABSTRACT

An adhesive composition comprising 10 to 80% by weight of a binder composed of an aminoalkyl ester group-containing acrylic copolymer shown

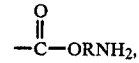

wherein R denotes an alkylene possessing 2 to 3 carbon atoms, as a pendant group and an epoxy resin, and if desired a rust-proofing pigment and a silane coupling agent.

20 Claims, No Drawings

ADHESIVE COMPOSITION

BACKGROUND OF THE INVENTION

1. Field of the Invention

This invention relates to an adhesive composition. More particularly, it relates to an adhesive composition which possesses a particularly excellent rust-proofing property and suits lamination of a polyvinyl fluoride film and a metallic sheet.

2. Description of the Prior Art

In recent years, laminated sheets of polyvinyl fluoride film excelling in stability to resist weather conditions, resist abrasion, and resist solvents have been attracting attention as materials for wallboards and materials for roof plates. The polyvinyl fluoride film is marketed by E. I. Du Pont de Nemours & Co., Inc. under the trademark designation of "Teddler". The Teddler produced in the form of film or sheet is superposed on metallic sheets and the resulting laminated sheets are used as building materials. The adhesive agent which is used for the lamination of this nature must fulfil the requirement that it should possess high adhesive strength, high cohesive strength, rich stability to resist hydrolysis, high resistance to weather conditions, and a rust-proofing property.

If the adhesive agent fails to fulfil the aforementioned requirement, the polyvinyl fluoride film cannot manifest its characteristics fully because the produced laminated sheet is susceptible to separation of component layers and the portions of the component layers joined by adhesion are liable to deterioration. As adhesive agents suitable for lamination of Teddler, those proposed by the same U.S. firm in Japanese Patent Publications SHO No. 38(1963)-18,530 and SHO No. 38(1963)-26,763 and U.S. Pat. No. 3,228,823 have been known to the art. These adhesive agents are produced by copolymerizing several methacrylates with a monomer containing an epoxy group and causing gaseous ammonia or primary monoamine to react upon the resulting polymers. These adhesive agents, therefore, are made of acrylic polymers possessing an amino group or imino group in the side chains thereof.

Meanwhile, the Teddler film to be joined by adhesion has the surface thereof has undergone a special surface treatment as disclosed in Japanese Patent Publication SHO No. 38(1963)-18,530 and U.S. Pat. No. 3,228,823. It is generally held that an adhesive agent which has as a main component thereof an acrylic polymer containing an amino group or imino group in the side chain thereof as disclosed in the aforementioned patent publications provides effective adhesion of the Teddler film and, therefore, proves satisfactory from the practical point of view.

The aforementioned acrylic polymer is a polymer possessing a group represented, for example, by the following formula:

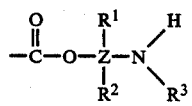

wherein Z stands for an aliphatic hydrocarbon residue of 2 or 3 carbon atoms, $R^1$ for hydrogen atom or an alkyl group of 1 to 8 carbon atoms, $R^2$ for hydrogen atom, a hydroxyl group, or an alkyl group of 1 to 8 carbon atoms, and $R^3$ for hydrogen atom or an alkyl group of 1 to 8 carbon atoms. It is obtained by causing an amine to react on a vinyl polymer such as glycidyl methacrylate or causing an imine compound to react on a vinyl polymer possessing a carboxyl group.

Since the laminated products of Teddler film and metallic sheets find utility mainly in outdoor applications, they require the rust-proofing property all the more (for example, edge portions or portions sustaining damge are susceptible to loss of adhesive strength due to corrosion) when they are used in districts with climates of high temperature and high humidity, or districts bordering the sea and tending to suffer from the damage done by the briny spray. Generally, the adhesive agent must exhibit an outstanding performance such as in adhesiveness, resistance to briny spray, and resistance to boiling water to corrosive metals such as, for example, substrates of cooled steel sheets, galvanized steel sheets, and aluminum sheets.

The qualities exhibited by the conventional adhesive agent, however, are not fully satisfactory.

An object of this invention, therefore, is to provide a novel adhesive composition.

Another object of this invention is to provide an adhesive composition suitable for lamination of a polyvinyl fluoride film and a metallic sheet.

A further object of this invention is to provide an adhesive composition capable of manifesting a well-balanced performance in adhesiveness, resistance to boiling water, resistance to moisture, corrosionproofness, and weatherability.

SUMMARY OF THE INVENTION

The objects described above are accomplished by an adhesive composition, which comprises (A) 10 to 80% by weight of a binder composed of (a) an aminoalkyl ester group-containing acrylic copolymer of (i) an essential monomer component formed of at least one (meth)acrylate selected from the group consisting of methyl methacrylate, alkyl methacrylates possessing an alkyl group of 2 to 12 carbon atoms, and alkyl acrylates possessing an alkyl group of 2 to 12 carbon atoms and (ii) a copolymerizable unsaturated carboxylic acid, the copolymer possessing a pendant group formed of an aminoalkyl ester group of the following formula I:

wherein R stands for an alkylene group of 2 or 3 carbon atoms branched from a carbon-carbon chain in the skeleton thereof and having a number average molecular weight approximately in the range of 1,500 to 100,000 as measured by gel permeation chromatography using polystyrene as a standard specimen and (b) an epoxy resin and (B) 90 to 20% by weight of an organic solvent.

The salient characteristic of the adhesive composition of the present invention resides in the fact that the adhesive composition far excels the conventional adhesive composition for the lamination of a polyvinyl fluoride film and a metallic sheet in terms of adhesive strength, resistance to boiling water, and resistance to briny spray.

DESCRIPTION OF THE PREFERRED EMBODIMENT

The aminoalkyl ester group-containing acrylic copolymer to be used in the present invention is a copolymer of (i) an essential monomer component formed of at least one (meth)acrylate selected from the group consisting of methyl methacrylate, alkyl methacrylates possessing an alkyl group of 2 to 12, preferably 2 to 8 carbon atoms, and alkyl acrylates having an alkyl group of 2 to 12, preferably 2 to 8 carbon atoms and (ii) a copolymerizable unsaturated carboxylic acid, and this copolymer possesses a pendant group formed of an aminoalkyl ester group of the following formula I:

wherein R stands for an alkylene group of 2 or 3 carbon atoms branched from the carbon-carbon chain in the skeleton thereof. The number averaged molecular weight of this copolymer measured by the gel permeation chromatography (hereinafter referred to as "GPC") using polystyrene as a standard specimen is approximately in the range of 1,500 to 100,000, preferably 10,000 to 50,000.

The aminoalkyl ester group-containing acrylic copolymer (a) is produced by copolymerizing (i) an essential monomer component formed of at least one (meth)acrylate selected from the group consisting of methyl methacrylate, alkyl methacryates, and alkyl acrylates with (ii) a copolymerizable unsaturated carboxylic acid, with the result that the carboxyl group in the resultant acrylic copolymer, on reaction with an alkyleneimine, will give rise to a pendant group formed of an aminoalkyl ester group branched from the skeleton of the polymer.

Typical examples of the essential monomer component (i) include methyl methacrylate, ethyl methacrylate, n-propyl methacrylate, isopropyl methacrylate, butyl methacrylates, pentyl methacrylates, hexyl methacrylates, ethylhexyl methacrylates, nonyl methacrylates, decyl methacrylates, lauryl methacrylate, ethyl acrylate, n-propyl acrylate, isopropyl acrylate, butyl acrylates, pentyl acrylates, hexyl acrylates, ethylhexyl acrylates, nonyl acrylates, decyl acrylates, and lauryl acrylate. Examples of the copolymerizable unsaturated carboxylic acid (ii) include monocarboxylic acids such as acrylic acid and methacrylic acid, dicarboxylic acids such as fumaric acid, maleic acid, itaconic acid, and citraconic acid, and half esters of the acids mentioned above. Among the acids enumerated above, acrylic acid and methacrylic acid prove particularly desirable. The monomer component (i) is used in an amount falling in the range of 70 to 99% by weight, preferably 80 to 95% by weight, in the aforementioned acrylic copolymer. The copolymerizable unsaturated carboxylic acids (ii) is used in an amount falling in the range of 1 to 20% by weight, preferably 5 to 15% by weight, in the acrylic copolymer. In the aforementioned acrylic copolymer, a vinyloxazoline ester, a dialkyl maleate such as dimethyl maleate or diethyl maleate, a dialkyl fumarate such as dimethyl fumarate or diethyl fumarate, and/or styrene may be incorporated to an extent incapable of impairing the characteristics of this invention besides the monomer components (i) and (ii).

The monomer components which make up the acrylic copolymer are selected with a view to enabling the finished adhesive composition to acquire both transition point and flexibility at desired levels.

The reaction of copolymerization for the production of the acrylic copolymer is carried out by charging a polymerization reactor with the monomer components, an organic solvent, and a polymerization initiator and allowing the resultant mixture to stand at a temperature approximately in the range of 50° to 200° C., preferably 60° to 100° C. for a period approximately in the range of 1 to 15 hours, preferably 8 to 13 hours.

Typical examples of the polymerization initiator to be used in the copolymerization include isobutyl peroxide, cumylperoxy neodecanoate, diisopropylperoxy dicarbonate, di-n-propylperoxy dicarbonate, 2,2′azobis(4-methoxy-2,4-dimethylvaleronitrile), 2,2′-azobis(2,-4dimethylvaleronitrile), azobisisobutyronitrile, t-butylcumyl peroxide, diisopropylbenzene hydroperoxide, cumene hydroperoxide, t-butyl hydroperoxide, cyclohexanone peroxide, t-butylperoxy isopropyl carbonate, methylethyl ketone peroxide, dicumyl peroxide, t-butyl hydroperoxide, benzoyl peroxide, and lauroyl peroxide. The polymerization initiator is used in an amount in the range of 0.01 to 1% by weight, preferably 0.1 to 0.5% by weight, based on the total amount of the monomer components.

Typical examples of the organic solvent effectively used in the copolymerization include benzene, toluene, xylene, ethyl acetate, isopropyl acetate, acetone, methylethyl ketone, methylisobutyl ketone, dioxane, tetrahydrofuran, cyclohexanone, methanol, ethanol, isopropanol, butanols, cyclohexanol, cyclohexane, diethyl ether, dimethyl formamide, dimethyl sulfoxide, and benzonitrile. Other aliphatic, alicyclic, and aromatic hydrocarbons, esters, ketones, and alcohols are other examples.

One preferable acrylic copolymer approximately comprises about 30 to 50% by weight of methyl methacrylate, 1 to 25% by weight of butyl acrylate, 30 to 50% by weight of butyl methacrylate, and 1 to 20% by weight of methacrylic acid (providing that the total of the component monomers mentioned is 100% by weight).

When the acrylic copolymer is caused to react with an alkylene imine such as ethylene imine or propylene imine, preferably ethylene imine, the consequent reaction of the carboxyl group of the copolymer with the alkylene imine gives rise to an aminoalkyl ester group-containing acryl copolymer (a) which possesses as a pendant group thereof an aminoalkyl ester group represented by the aforementioned formula I. The amount of the alkylene imine to be used for the reaction with the aforementioned acryl copolymer is in the range of 0.5 to 5 equivalents, preferably 0.8 to 3 equivalents, per mol of the carboxyl group in the acrylic copolymer. The reaction of the acrylic copolymer for modification into an aminoalkyl ester is carried out in the aforementioned organic solvent at a temperature in the range of 20° to 120° C., preferably 30° to 90° C., for a period in the range of 1 to 10 hours, preferably 2 to 7 hours.

The epoxy resin (b) to be used in the present invention is either a β-methylepichloro type epoxy resin or a novolac type epoxy resin. The β-methylepichloro type epoxy resin possesses a structure of the following formula:

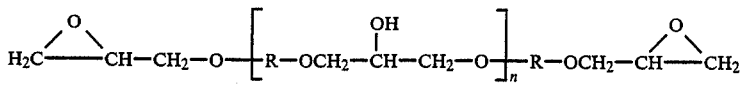

wherein n stands for an integral number in the range of about 0.5 to 4. Desirably, this epoxy resin is the product of polymerization of epichlorohydrin with bis-phenol A. When this preferable epoxy resin is used, the symbol R in the aforementioned formula is a unit of the structure of the following formula:

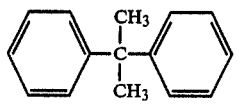

Typical examples of the preferable epoxy resin are a product of Shell Chemical Co. having an equivalent weight of about 185 to 192 (marketed under the trademark designation of "Epon 828") and a product of Dow Chemical Co. having an equivalent weight of about 182 to 190 (marketed under trademark designation of "DER 331"). Another product of Shell Chemical Co. having an equivalent weight of about 450 to 550 (marketed under the trademark designation of "Epon 1001") may be cited as another embodiment. The term "equivalent weight" as used herein means the number of grams of a given resin possessing 1 g of epoxide.

One typical example of the novolac type epoxy resin is a product of Shell Chemical Co. (marketed under the trademark designation of "Epon 1031") having a structure of the following formula:

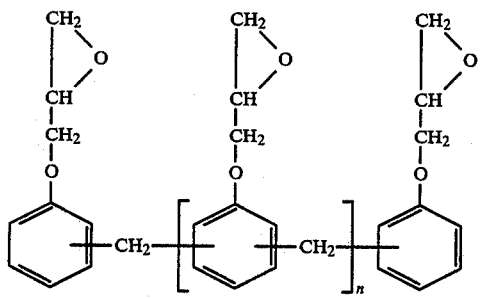

In the epoxy resins of varying types mentioned above, the β-methylepichloro type epoxy resin proves particularly desirable.

The mixing ratio of the aminoalkyl ester-containing acrylic copolymer (a) to the epoxy resin (b) is such that the amount of the epoxy resin (b) falls in the range of 1 to 30 parts by weight, preferably 5 to 20 parts by weight, based on 100 parts by weight of the aminoalkyl ester group-containing acrylic copolymer (a).

The adhesive composition according with this invention, when necessary, may incorporate therein a rust-proofing agent. The rust-proofing agent usable for incorporation in the adhesive composition of this invention can be any of the rust-proofing substances heretofore known and used in the art. As representatives of such rust-proofing substances, there may be cited various chromates such as basic lead chromate, zinc chromate, strontium chromate, and barium chromate; various lead type compounds such as calcium plumbate and lead cyanamide; various phosphate type commands such as zinc phosphate, ammonium tripolyphosphate, zinc phosphite, and aluminum phosphomolybdate; various molybdate type compounds such as basic zinc molybdate and calcium molybdate; various borate type compounds such as barium metaborate, calcium metaborate, and silicate calcium borosilicate; various iron oxide type compounds such as micaceous iron oxide (MIO) and magnetic ferrites represented by the chemical formula, $MeOFe_2O_3$ (wherein Me stands for a bivalent metallic atom such as Ca, Sr, Ba, Mg, Zn, or Mn); and tungstate type compounds. These rust-proofing pigments can be used either singly or in the form of a mixture of two or more members. Suitably, the rust-proofing pigment is used in an amount falling in the range of 0.1 to 40% by weight, preferably 5 to 20% by weight, based on the amount of the binder. If the amount of the rust-proofing pigment is less than 0.1% by weight, then the produced adhesive composition is deficient in the rust-proofing property. If this amount exceeds 40% by weight, the adhesive composition is deficient in resistance to water and to moisture. The aminoalkyl ester group-containing acryl copolymer in the binder is required to be dispersible in the epoxy resin.

Further, the adhesive composition of this invention is allowed to incorporate therein a coloring pigment or a dye so that during continuous application of the adhesive composition to a substrate, the condition of the application of this composition to a substrate, the condition of the application of this composition may be rated with ease. The coloring pigment is selected from among the conventional inorganic pigments such as, for example, titanium dioxide, chrome yellow, titanium yellow, and chromium oxide which have been known and used in the art. The dye is selected from among the conventional disperse dyes such as those products marketed under the trademark designations of Kayaset Yellow G, Kayaset Yellow 937, and Kayaset Yellow K-RL. Desirably, the dye combines a coloring power and hiding power. It is further required to be dispersible in the acrylic polymer or epoxy resin of the binder. The dyes enumerated above may be used either singly or in the form of a mixture of two or more members. It may concurrently serve as a rust-proofing pigment mentioned above. Suitably the coloring pigment or dye is used in an amount falling in the aforementioned range of 0.1 to 40% by weight, preferably 0.5 to 20% by weight, based on the amount of the binder. If the amount of the coloring pigment or dye is less than 0.1% by weight, then the produced adhesive layer is deficient in the coloring power and the hiding powder. If this amount exceeds 40% by weight, the adhesive layer is deficient in the resistance to water and to moisture.

The dispersion of the rust-proofing pigment and the coloring pigment or the dye can be carried out by any of the conventional means of dispersion such as a ball mill, a sand grinder, an attriter, or a Dyno mill. During this dispersion, the components being mixed may incorporate therein such additives as a dispersion stabilizer, a sedimentation inhibitor, and a caking inhibitor.

The adhesive composition of the present invention, when necessary, may incorporate therein a silane coupling agent. The silane coupling agent can be any of the conventional silane coupling agents known to the art. Typical examples of the silane coupling agent include 3-aminopropyl triethoxy silane, 3-glycidoxypropyl trimethoxy silane, 3-methacryloxypropyl trimethoxy silane, vinyl trimethoxy silane, vinyl triethoxy silane, vinyl tris($\beta$-methoxyethoxy)silane, vinyl triacetyl silane, $\beta$-3,4-epoxycyclohexyl)ethyltrimethoxy silane, $\beta$-mercaptopropyl trimethoxy silane, $\gamma$-mercaptoethyltriethoxy silane, $\gamma$-chloropropyltrimethoxy silane, $\gamma$-chloropropyltriethoxy silane, and vinyltrichloro silane. These silane coupling agents may be used either singly or in the form of a mixture of two or more members.

Desirably, the silane coupling agent is used in an amount falling in the range of 0.1 to 10% by weight, preferably 0.4 to 6% by weight, based on the weight of the binder. If the amount of the silane coupling agent is not less than 0.1% by weight, then the adhesive composition is incapable of manifesting the ability to resist water and moisture to a satisfactory extent. If this amount exceeds 10% by weight, the adhesive composition is deficient in hot life, adhesive strength, and fabricability.

The adhesive composition of the present invention preferably comprises three components.

The component (1) is formed of an acrylic polymer. The component (2) comprises an epoxy resin, a rust-proofing pigment, and a coloring pigment or a dye. The component (3) is formed of a silane coupling agent. These three components of the composition are mixed preparatorily to actual use of the composition. Examples of the organic solvent to be used in the adhesive composition include aliphatic hydrocarbons such as hexane, heptane, and octane, alicyclic hydrocarbons such as cyclohexane, aromatic hydrocarbons such as benzene, toluene, and xylene, alcohols such as methanol, ethanol, n-propanol, isopropanol, butanols, cyclohexanol, and benzyl alcohol, ketones such as acetone, methylethyl ketone, methylisobutyl ketone, diethyl ketone, and cyclohexanone, esters such as methyl acetate and ethyl acetate, ethers such as diethy ether, dioxane, and tetrahydrofuran, glycol ethers such as methyl cellosolve and ethyl cellosolve, and dimethyl formamide, dimethyl sulfoxide, and benzonitriles. Among other organic solvents enumerated above, alcohols, esters, and aromatic hydrocarbons prove particularly desirable.

Desirably, the mixing ratio of the binder (A) to the organic solvent (B) is such that the amount of the binder (A) falls in the range of 10 to 80% by weight, preferably 15 to 50% by weight and that of the organic solvent in the range of 90 to 20% by weight, preferably 50 to 85% by weight.

The adhesive composition of the present invention is applied on a corrosive metallic sheet as a substrate by the conventional coating method using a roll coater or a curtain flow coater. The coated metallic sheet is then dried to expel the solvent. The dry coated metallic sheet and the Teddler film superposed thereon are passed between nip rollers for lamination.

In the laminated sheet consequently obtained, the adhesive composition used therein exhibits a satisfactory adhesive property to the substrate and excels in corrosion proofness.

Now, examples of the synthesis of polymer, the dispersion of a pigment in an epoxy resin, and the formulation of an adhesive composition, and working examples of the invention will be cited below.

SYNTHESIS 1

A glass reactor having an inner volume of 2 liters and provided with a stirrer, a condenser, a thermometer, and a nitrogen gas inlet was charged with 180 g of methyl methacrylate, 180 g of butyl methacrylate, 75 g of butyl acrylate, and 60 g of methacrylic acid and 683 g of toluene and 293 g of isopropanol as solvents in combination with 1.5 g azobisisobutyronitrile as a polymerization catalyst. Under continued introduction of nitrogen gas, the mixture in the reactor was stirred at 80° to 85° C. for 12 hours for polymerization of the monomers. Then, the resultant reaction mixture and 30 g of ethyleneimine added thereto were left aging at 80° to 85° C. for 3 hours. The aged reaction mixture was distilled under a vacuum to expel the unaltered ethyleneimine. Consequently, there was obtained an aminoalkyl ester group-containing acyl copolymer solution. This polymer solution had a heating residue of 35.0% by weight and a #4 Ford Cup Viscosity of 220 seconds at 20° C. The number average molecular weight of this polymer solution measured by GPC was 34,000. It had a free ethyleneimine concentration of 0.3 ppm.

EXAMPLE OF DISPERSION OF PIGMENT, ETC. IN EPOXY RESIN

Examples of dispersion 1–5

By the use of a dispersing machine, a varying pigment or a dye and additives in mixing amounts indicated in Table 1 were dispersed until a particle size of not more than 6 μm.

TABLE 1

| | Examples of dispersion (parts by weight) | | | | |
|---|---|---|---|---|---|
| | Dispersion 1 | Dispersion 2 | Dispersion 3 | Dispersion 4 | Dispersion 5 |
| Epoxy resin *1 | 58.7 | 58.7 | 58.7 | 58.7 | 58.7 |
| Zinc phosphate | 12.9 | | | | |
| Strontium chromate | | 12.9 | | | |
| Zinc molybdenum | | | 12.9 | | |
| Titanium dioxide | | | | | 12.9 |
| Dye *2 | | | | | 1.5 |
| Anti Caking agent | | 1.0 | | | |
| Toluene | 28.4 | 27.4 | 28.4 | 41.3 | 14.0 |

*1: Epikote 828 (product of Yuka Shell Epoxy Co., Ltd.)
*2: Dye (product of Nihon Kayaku K. K.)

EXAMPLES OF FORMULATION OF ADHESIVE COMPOSITION 1–7

Adhesive compositions were prepared by combining the component (1), i.e. the acrylic polymer solution synthesized as described above, the component (2), i.e. the pigment dispersed in the epoxy resin, and the component (3), i.e. a silane coupling agent in varying mixing ratios shown in Table 2.

TABLE 2

| Component | Name of component | Mixing ratio (parts by weight) | Adhesive composition | | | | | | |
|---|---|---|---|---|---|---|---|---|---|
| | | | Formulation 1 | Formulation 2 | Formulation 3 | Formulation 4 | Formulation 5 | Formulation 6 | Formulation 7 |
| 1 | Aminoalkyl ester group-containing acrylic copolymer solution | 100 | Synthesis 1 | Synthesis 1 | Synthesis 1 | Synthesis 1 | Synthesis 1 | Synthesis 1 | Synthesis 1 |
| 2 | Pigment dispersed in epoxy resin | 10 | Dispersion 1 | Dispersion 2 | Dispersion 3 | Dispersion 4 | Dispersion 5 | Dispersion 6 | Dispersion 7 |
| 3 | Silane coupling agent | 1 | APS-E | APS-E | APS-E | APS-E | APS-E | — | GPS-M |

Silane coupling agent:
APS-E: 3-Aminopropyl triethoxy silane
GPS-M: 3-Glycidoxypropyl trimethoxy silane

EXAMPLE 1

Through the medium of the adhesive composition of Formulation 1 of the Formulation shown in Table 2 (composed of 100 parts by weight of the acrylic polymer solution of Synthesis 1, 10 parts by weight of the pigment dispersed in the epoxy resin of Dispersion 1, and one part by weight of a silane coupling agent), a pigment-containing polyvinyl fluoride film 38 μm is thickness (produced by E. I. DuPont de Numours & Company and marketed under the trademark designation of "Teddler Film 150BL30HB") and a hot dip galvanized steel sheet 0.4 mm in thickness (produced by Nittetsu Kenzai Kogyo K.K. and marketed under the trademark designation of "GD BT-K Processed Sheet") were laminated by the following method. On the hot dip galvanized steel sheet, the adhesive composition was applied in an amount calculated to decrease, on drying, to a thickness of 6 μm. The steel sheet was left standing in an oven at 250° C. for about 1 minute to expel the solvent. The steel sheet was taken out of the oven. Then, the polyvinyl fluoride film was placed in contact with the coating surface of the adhesive composition on the steel sheet. The superposed film and steel sheet were passed between nip rolls set to exert pressure of 10 kg/cm² G to carry out intimate adhesion of the two layers. The laminate sheet consequently obtained was cooled and subjected to various tests to evaluate the adhesive composition.

The results of the evaluation are as shown in Table 3.

(Method of Evaluation)

Adhesiveness: This is used as a criterion of the ease with which the polyvinyl fluoride film is separated from the substrate after the adhesive agent is solidified. The test for adhesiveness is carried out by incising the laminated sheet with a cutter knife to insert parallel cuts separated by a pitch of 5 mm past the film layer to the substrate and further incising the laminated sheet to insert similar parallel cuts perpendicularly to the first cuts. Extrusion is made in 7 mm with an Erichsen tester.

The adhesiveness is rated by the five-point scale, wherein:
5 stands for perfect absence of separation,
4 for no perfect separation of the square of 5 mm at the top,
3 for perfect separation of the square of 5 mm at the top,
2 for separation of the parts halfway along the oblique surface, and
1 for separation of the lower parts in the oblique surface.

Resistance to boiling water: This constitutes a criterion of the adhesiveness of a given laminated sheet after two hours' standing of the sample in boiling water. The method of the test and the evaluation after the immersion in the boiling water are the same as those used in the case of the adhesiveness.

Resistance to briny spray: This is a criterion of the resistance offered by a given laminated sheet to the rusting caused by briny spray. The test for this resistance is carried out by inserting cross cuts past the polyvinyl fluoride film layer to the adhesive agent layer, subjecting the incised sample to SST (using a briny spray tester marketed under the trademark designation of "Suga ST-ISO-3") at 35° C. for 1,000 hours, and examining the sample with respect to the degree of rusting caused.

The resistance is rated by the five-point scale, wherein:
5 stands for substantial absence of rusting and
1 for heavy rusting.

Resistance to moisture: This is a criterion of the resistance of a given laminated sheet to moisture. The test for this resistance is carried out by allowing the sample to stand under the conditions of 50° C. and at least 95% RH for 20 days (using a wetting tester marketed under the trademark designation of "Suga CT-3"), and measuring the adhesiveness of the sample. The method of test and the evaluation are the same as those used with respect to the adhesiveness.

Weatherability: This is a criterion of the resistance offered by a given laminated sheet to weather conditions. The test for the weatherability is carried out by allowing the sample to stand in a dew-cycle weather-meter (a dew-cycle sunshin super-long life weather-meter marketed under the trademark designation of WEL-SUN-PC-BEM) for 1,000 hours and measuring the adhesiveness of the sample.

EXAMPLES 2–5 AND CONTROLS 1–3

Laminated sheets were produced by following the procedure of Example 1, excepting adhesive composition of of Formulations 2–7 shown in Table 2 were used instead. The lamianted sheets were subjected to the tests of evaluation.

Control 3 used an adhesive composition for use with metals produced by E. I. DuPont de Nemours & Co.

The results of the evaluation are as shown in Table 3.

TABLE 3

| | Results of evaluation | | | | | | | |
|---|---|---|---|---|---|---|---|---|
| | Example | | | | | Control | | |
| | 1 | 2 | 3 | 4 | 5 | 1 | 2 | 3 |
| Formulation No. of adhesive composition | 1 | 2 | 3 | 5 | 7 | 4 | 6 | — |
| Adhesiveness | 5 | 5 | 5 | 5 | 5 | 5 | 4 | 4 |
| Resistance to boiling water | 4 | 4 | 4 | 4 | 3 | 4 | 1 | 2 |
| Resistance to moisture | 4 | 4 | 4 | 4 | 3 | 4 | 2 | 3 |
| Resistance to SST | 5 | 5 | 4 | 5 | 5 | 2 | 4 | 3 |
| Weatherability | 4 | 4 | 4 | 4 | 3 | 4 | 3 | 3 |

Control 3:
Adhesive agent (100/10 mixture of #68070/#68065) for metals (produced by E. I. DuPont de Nemours & Co.)

EXAMPLES 6-7

Laminated sheets were produced by following the procedure of Example 1, excepting an aluminum sheet and a cold roled steel sheet were used as substrates for lamination. They were tested for evaluation. The results are as shown below.

| | Example No. | |
|---|---|---|
| | 6 | 7 |
| Formulation No. of adhesive composition | Formulation 5 | Formulation 5 |
| Substrate | Aluminum steel sheet | Cold rolled steel sheet |
| Adhesiveness | 5 | 5 |
| Resistance to boiling water | 4 | 4 |
| Resistance to moisture | 4 | 4 |
| Resistance to SST | 4 | 4 |
| Weatherability | 4 | 4 |

The aluminum sheet was prepared by treating an aluminum sheet 0.4 mm in thickness with a chromic acid mixture. The cold rolled steel sheet was used after it had been degreased.

As noted from the working examples, this invention can produce a laminated sheet which manifests a well-balanced performance in adhesiveness, resistance to boiling water, resistance to moisture, corrosionproofness, and weatherability, invariably far excelling the performance of the conventional countertype.

What is claimed is:

1. An adhesive composition, consisting essentially of
   (A) 10 to 80% by weight of a binder composed of
      (a) an acrylic copolymer containing an aminoalkyl ester group obtained by reaction of
      (i) a monomer component formed of at least one (meth)acrylate selected from the group consisting of methyl methacrylate, alkyl methacrylates possessing an alkyl group of 2 to 12 carbon atoms, and alkyl acrylates possessing an alkyl group of 2 to 12 carbon atoms and
      (ii) a copolymerizable unsaturated carboxylic acid, to form a resultant acrylic copolymer; and
      (iii) with 0.5 to 5 equivalents of an alkylene imine of formula R=NH per mole of carboxyl groups on said resultant acrylic copolymer to form pendant aminoallryl ester groups of the following formula:

$$-\overset{O}{\underset{\|}{C}}ORNH_2 \qquad (I)$$

wherein R is an alkylene group of 2 or 3 carbon atoms, said copolymer (a), having a number average molecular weight approximately in the range of 1500 to 100,000 as measured by gas permeation chromatography using polystyrene as a standard specimen, and
      (b) an epoxy resin selected from the group consisting of beta methyl epichloro- and novolac-epoxy resins,
   (B) 90 to 20% by weight of an organic solvent, and
   (C) 0.1 to 40% by weight of at least one rust-proofing pigment selected from the group consisting of a phosphate, strontium chromate, zinc molybdate, plumbates, a borate, an iron oxide and a tungstate, based on said binder.

2. An adhesive composition according to claim 1, wherein said epoxy resin (b) is incorporated in an amount of 1 to 30 parts by weight based on 100 parts by weight of said aminoalkyl ester group-containing acrylic copolymer (a).

3. An adhesive composition according to claim 2, wherein said essential monomer component (i) is incorporated in an amount of 70 to 99% by weight and said copolymerizable unsaturated carboxylic acid in an amount of 1 to 20% by weight, respectively based on the amount of said aminoalkyl ester gruop-containing acrylic copolymer (a).

4. An adhesive composition according to claim 1, wherein said essential monomer component (i) is selected from the group consisting of methyl methacrylate, alkyl methacrylates possessing an alkyl group of 2 to 8 carbon atoms, and alkyl acrylates possessing an alkyl group of 2 to 8 carbon atoms.

5. An adhesive composition according to claim 4, wherein said copolymerizable unsaturated carboxylic acid (ii) is acrylic acid or methacrylic acid.

6. An adhesive composition according to claim 2, wherein said epoxy resin is a β-methylepichloro epoxy resin represented by the following formula:

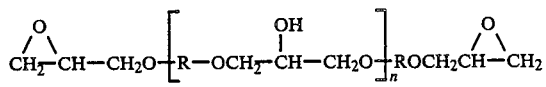

wherein R stands for a unit of the formula,

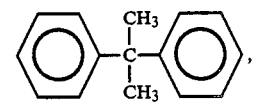

and n for a integral number approximately in the range of 0.5 to 4.

7. An adhesive composition according to claim 6, wherein said β-methylepichloro epoxy resin (b) is incorporated in an amount of 1 to 30 parts by weight based on 100 parts by weight of said aminoalkyl ester group-containing acrylic copolymer (a).

8. An adhesive composition according to claim 2, which comprises 10 to 80% by weight of said binder and 90 to 20% by weight of said organic solvent.

9. An adhesive composition according to claim 8, wherein the number average molecular weight of said aminoalkyl ester group-containing acrylic copolymer (a) in the range of 10,000 to 50,000.

10. An adhesive composition, comprising:

(A) 10 to 80% by weight of a binder composed of
(a) an acrylic copolymer containing an aminoalkyl ester group obtained by reaction of
(i) a monomer component formed of at least one (meth)acrylate selected from the group consisting of methyl methacrylate, alkyl methacrylates possessing an alkyl group of 2 to 12 carbon atoms, and alkyl acrylates possessing an alkyl group of 2 to 12 carbon atoms and
(ii) a copolymerizable unsaturated carboxylic acid, to form a resultant acrylic copolymer, and
(iii) with 0.5 to 5 equivalents of an alkylene imine of formula R=NH per mole of carboxyl groups on said resultant copolymer to form pendant aminoalkyl ester groups of the following formula

(I)

wherein R is an alkylene group of 2 or 3 carbon atoms, said copolymer (a), having a number average molecular weight approximately in the range of 1500 to 100,000 as measured by gas permeation chromatography using polystyrene as a standard specimen, and
(b) an epoxy resin selected from the group consisting of beta methyl epichloro- and novolac-epoxy resins,
(B) 90 to 20% by weight of an organic solvent,
(C) 0.1 to 40% by weight of at least one rust-proofing pigment selected from the group consisting of a phosphate, strontium chromate, zinc molybdate, a plumbates, a borate, an iron oxide and a tungstate, based on said binder, and
(D) 0.1 to 40% by weight of a silane coupling agent based on said binder.

11. An adhesive composition according to claim 10, wherein said epoxy resin (b) is incorporated in an amount of 1 to 30 parts by weight based on 100 parts by weight of said aminoalkyl ester group-containing acrylic copolymer (a).

12. An adhesive composition according to claim 11, wherein said essential monomer component (i) is incorporated in an amount of 70 to 99% by weight and said copolymerizable unsaturated carboxylic acid in an amount of 1 to 20% by weight, respectively based on the amount of said aminoalkyl ester gruop-containing acrylic copolymer (a).

13. An adhesive composition according to claim 10, wherein said essential monomer component (i) is selected from the group consisting of methyl methacrylate, alkyl methacrylates possessing an alkyl group of 2 to 8 carbon atoms, and alkyl acrylates possessing an alkyl group of 2 to 8 carbon atoms.

14. An adhesive composition according to claim 13, wherein said copolymerizable unsaturated carboxylic acid (ii) is acrylic acid or methacrylic acid.

15. An adhesive composition according to claim 11, wherein said epoxy resin is a β-methylepichloro epoxy resin represented by the following formula:

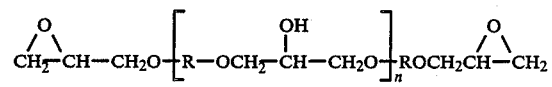

wherein R stands for a unit of the formula,

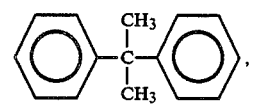

and n for a integral number approximately in the range of 0.5 to 4.

16. An adhesive composition according to claim 15, wherein said β-methylepichloro epoxy resin (b) is incorporated in an amount of 1 to 30 parts by weight based on 100 parts by weight of said aminoalkyl ester group-containing acrylic copolymer (a).

17. An adhesive composition according to claim 11, which comprises 10 to 80% by weight of said binder and 90 to 20% by weight of said organic solvent.

18. An adhesive composition according to claim 17, wherein the number average molecular weight of said aminoalkyl ester group-containing acrylic copolymer (a) in the range of 10,000 to 50,000.

19. An adhesive composition according to claim 11, wherein said aminoalkyl ester group-containing acrylic copolymer is produced by subjecting the product of reaction of about 30 to 50% by weight of methyl methacrylate, 1 to 25% by weight of butyl acrylate, 30 to 50% by weight of butyl methacrylate, and 1 to 20% by weight of methacrylic acid providing that the total of said components is 100% by weight to aminoalkyl ester modification with an alkyleneimine.

20. An adhesive composition according to claim 2, wherein said aminoalkyl ester group-containing acrylic copolymer is produced by subjecting the product of reaction of about 30 to 50% by weight of methyl methacrylate, 1 to 25% by weight of butyl acrylate, 30 to 50% by weight of butyl methacrylate, and 1 to 20% by weight of methacrylic acid providing that the total of said components is 100% by weight to aminoalkyl ester modification with an alkyleneimine.

* * * * *